INVENTORS
Benjamin F. Boehm &
BY Charles D. Simmons

Paul J. Ethington
ATTORNEY

United States Patent Office 3,155,952
Patented Nov. 3, 1964

3,155,952
CONDITION INDICATING SYSTEM
Benjamin F. Boehm, Oak Park, and Charles D. Simmons, Rochester, Mich., assignors to General Motors Corporation, Detroit, Mich., a corporation of Delaware
Filed Jan. 10, 1962, Ser. No. 165,364
4 Claims. (Cl. 340—244)

This invention relates to a condition indicating system and more particularly to an electrically operable three condition indicating system.

One form of an electrically operable three condition indicating system known in the prior art comprises a circuit having three electrical indicating devices, each having a different resistance. The devices are connected together in series across a voltage source whereby only the device having the greatest resistance will be active when full current flows through the circuit. Means are provided for selectively short-circuiting two of the devices so as to have the effect of selectively activating the devices of lower resistance and disabling the devices of higher resistance. However, a three condition indicating system of the type described requires electrical indicating devices each having a difference resistance.

In accordance with this invention, an electrically operable three condition indicating system is provided which does not require each electrical indicating device to be of a different resistance. This is accomplished with first and second circuits each including a switch and an electrical indicating device of equal impedance connected together in parallel and in series with a third circuit across a voltage source. The third circuit also includes an electrical indicating device whereby the impedance of the third circuit is less than the impedance of either the first or the second circuit so that upon closure of either the first or the second switch the third device will be inactive and the first or second device, respectively, will be active and upon closure of both switches the third device will be active and the first and second devices will be inactive.

A more complete understanding of this invention may be had from the detailed description which follows taken with the accompanying drawings in which.

Figure 1:
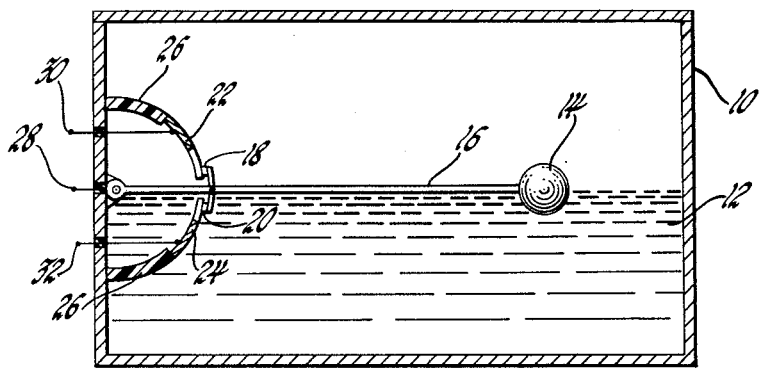
FIGURE 1 is a sectional view showing an application of the embodiments of the invention shown in FIGURE 2 and FIGURE 3.

Referring now to the drawings and more particularly to FIGURE 1, there is shown a closed casing 10 which may take the form of a vehicle gasoline tank which is one-half filled with fluid 12 and a float 14 fixed with the free end of a float arm 16 pivotally mounted at the other end with the casing 10. The arm 16 has mounted thereon movable spring contacts 18 and 20 adapted for being respectively spring biased into contact with stationary contacts 22 and 24, respectively, mounted on a support member 26 which is in turn fixed with the casing 10. The stationary contacts 22 and 24 are positioned on the support member 26 and the movable contacts 18 and 20 are positioned on the arm 16 such that at both ends of travel of the arm 16 between liquid full and liquid empty conditions of casing 10 both movable contacts will be in contact with one stationary contact and when the casing 10 is one-half filled with fluid 12 the movable contacts 18 and 20 will be respectively in contact with stationary contacts 22 and 24. The arm 16 is of conductive material and has a conductor 28 connected therewith at its pivoted end. The stationary contacts 22 and 24 have respectively connected therewith conductors 30 and 32. The conductors 28, 30 and 32 may be connected with the three condition liquid level indicator circuits as shown in FIGURES 2 and 3 for indicating levels of fluid 12 in the casing 10.

Figure 2:
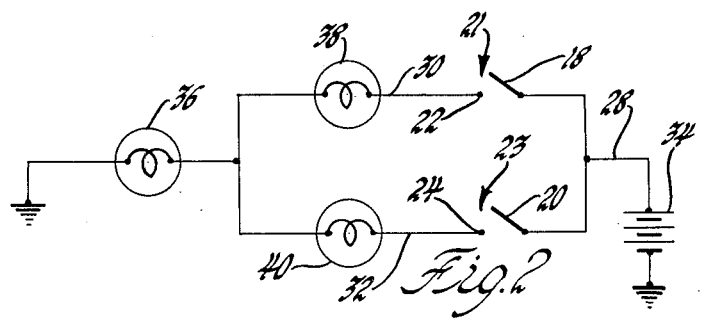
FIGURE 2 is a schematic circuit diagram of one embodiment of the invention.
Figure 3:
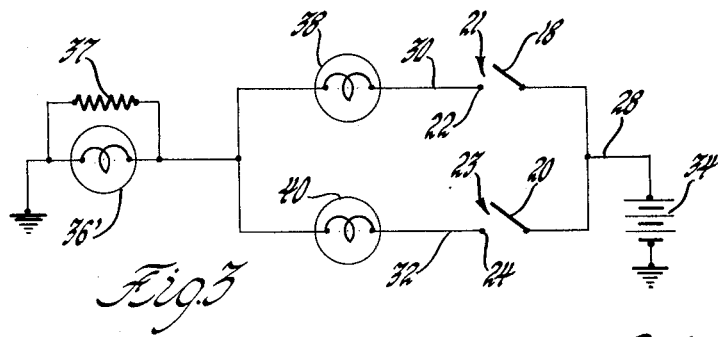
FIGURE 3 is a schematic circuit diagram of a second embodiment of the invention.

In FIGURE 2, there is shown a schematic circuit diagram of one embodiment of the invention and comprises a D.C. voltage source 34 which may take the form of a vehicle storage battery, lamps 36, 38 and 40 and on-off switches 21 and 23. The on-off switch 21 includes the movable contact 18 and the stationary contact 22, and the on-off switch 23 comprises the movable contact 20 and the stationary contact 24. The on-off switches 21 and 23 respectively connect lamps 38 and 40 together in parallel via conductors 30 and 32, respectively, and in series with the lamp 36 across the source 34, via the conductor 28.

The lamps 36, 38 and 40 are chosen such that the filament of lamp 38 is equal in resistance to the filament of lamp 40 and greater in resistance than the filament of lamp 36. Thus upon closure of either switch 21 or 23 current will flow through the lamps from the source 34 whereby the lamp 38 or 40, respectively, will glow more brightly than lamp 36 since with current of equal value flowing through the lamps the lamp exhibiting the highest resistance will glow the brightest. If both switches 21 and 23 are closed thereby connecting lamps 38 and 40 together in parallel current will flow through lamp 36 and will divide equally between lamps 38 and 40 and hence lamp 36 will glow more brightly than either lamp 38 or 40. For this to occur, it is obvious that the resistance of the filament of lamp 36 must be greater than the parallel resistance of the filaments of lamps 38 and 40.

The operation of the circuit shown in FIGURE 2 may be understood from the following examples. When the casing 10 is completely filled with liquid 12 the movable contact 18 will be in contact with the stationary contact 22 and the movable contact 20 will not be in contact with the stationary contact 24 so that current will flow from the source 34 through lamps 38 and 36 and hence the lamp 38 will glow more brightly than the lamp 36 indicating that the casing 10 is completely filled with liquid 12. When the casing 10 is one-half filled with liquid 12 the movable contacts 18 and 20 will be in contact with the stationary contacts 22 and 24, respectively, so that current will flow from the source 34 through the lamp 36 and will divide equally between the parallelly connected lamps 38 and 40 whereby the lamp 36 will glow more brightly than either lamp 38 or 40 indicating that the casing 10 is one-half filled with liquid 12. However, when the level of fluid 12 in the casing 10 becomes low enough such that the movable contact 20 will be in contact with the stationary contact 24 and that the movable contact 18 will not be in contact with the stationary contact 22, current will flow from the source 34 through the lamps 40 and 36 whereby the lamp 40 will glow more brightly than the lamp 36, indicating that the level of fluid 12 in the casing 10 is low.

In FIGURE 3 there is shown a second embodiment of the invention which is essentially identical in structure with the embodiment shown in FIGURE 2 except that a lamp 36' has been substituted for lamp 36, whereby the resistance of the filament of lamp 36' is equal to the resistance of the filament of each of the lamps 38 and 40, and that a shunt resistor 37 having a resistance greater than the resistance of the filament of lamp 36' is connected in parallel with the lamp 36' so as to effectively decrease the resistance of lamp 36'. The operation of the circuit shown in FIGURE 3 is identical with that of the circuit shown in FIGURE 2 and hence a discussion of the operation is not necessary for a clear understanding of the invention.

Although the description of this invention has been given with respect to two embodiments, it is not to be construed in a limiting sense. Numerous variations and modifications within the spirit and scope of the invention will now occur to those skilled in the art. For a definition

We claim:

1. A condition indicating system comprising a voltage source, a first circuit including a first electrical indicating device and a first switching means, a second circuit including a second electrical indicating device and a second switching means, and a third circuit including a third electrical indicating device, the first and second circuits connected together in parallel and in series with the third circuit across the voltage source, each of the first and second circuits having an impedance greater than that of the third circuit and the third circuit having an impedance greater than the parallel impedance of the first and second circuits whereby upon closure of either the first or second switching means the first or second indicating device, respectively, will be active and the third indicating device will be inactive, and upon closure of both the first and second switching devices the third indicating device will be active and the first and second indicating devices will be inactive.

2. A condition indicating system comprising a voltage source, a first circuit including a first lamp and a first on-off switch, a second circuit including a second lamp and a second on-off switch, each on-off switch including a movable contact and a stationary contact, condition responsive means connected with the movable contacts and operative to selectively open and close the switches, and a third circuit including a third lamp, the first and second circuits connected together in parallel and in series with the third circuit across the voltage source, the first circuit having a resistance equal to that of the second circuit and greater than that of the third circuit and the third circuit having a resistance greater than the parallel resistance of the first and second circuits whereby upon closure of either the first or second on-off switch the first or second lamp, respectively, will glow more brightly than the third lamp and upon closure of both the first and second on-off switches the third lamp will glow more brightly than either the first or second lamp.

3. A condition indicating system comprising a voltage source, a first on-off switch connecting first and second series connected lamps across the source, a second switch connecting the first lamp and a third lamp connected in series with the first lamp across the source, each on-off switch including a movable contact and a stationary contact, condition responsive means connected with the movable contacts and operative to selectively open and close the switches, the second lamp having a resistance equal to that of the third lamp and greater than that of the first lamp and the first lamp having a resistance greater than the parallel resistance of the second and third lamps whereby upon closure of either the first or the second on-off switch the second or the third lamp, respectively, will glow more brightly than the first lamp and upon closure of both the first and the second on-off switches the first lamp will glow more brightly than either the second or third lamp.

4. A condition indicating system comprising a voltage source, a first circuit including a first lamp and a first on-off switch, a second circuit including a second lamp and a second on-off switch, each on-off switch including a movable contact and a stationary contact, condition responsive means connected with the movable contacts and operative to selectively open and close the switches, and a third circuit including a third lamp, the first and second circuits connected together in parallel and in series with the third circuit across the source, each lamp having a resistance of equal value, a shunt resistor of greater resistance than the third lamp and connected in parallel with the third lamp whereby upon closure of either the first or second on-off switch the first or second lamp, respectively, will glow more brightly than the third lamp and upon closure of both the first and second on-off switches the third lamp will glow more brightly than either the first or second lamp.

References Cited in the file of this patent

UNITED STATES PATENTS

| | | |
|---|---|---|
| 348,155 | Dyer | Aug. 24, 1884 |
| 1,147,949 | Keen | July 27, 1915 |
| 1,234,028 | Hornsberger | July 17, 1917 |
| 1,330,571 | Axtell | Feb. 10, 1920 |
| 2,962,703 | Summerer | Nov. 29, 1960 |